Oct. 15, 1963 M. L. CRIPE 3,106,873
LOW COST FLUID PRESSURE SERVOMOTOR
Filed Dec. 13, 1960 2 Sheets-Sheet 1

INVENTOR.
MAXWELL L. CRIPE
BY
William P. Hickey
ATTORNEY

United States Patent Office 3,106,873
Patented Oct. 15, 1963

3,106,873
LOW COST FLUID PRESSURE SERVOMOTOR
Maxwell L. Cripe, South Bend, Ind., assignor to The Bendix Corporation, South Bend, Ind., a corporation of Delaware
Filed Dec. 13, 1960, Ser. No. 75,596
7 Claims. (Cl. 91—369)

The present invention relates to fluid pressure motors; and more particularly to an inexpensive fluid pressure servomotor construction.

An object of the present invention is the provision of a new and improved fluid pressure servomotor which is simple in design, rugged in its construction, and inexpensive to manufacture.

Another object of the present invention is the provision of a fluid pressure motor having a minimum of parts.

A further object of the present invention is the provision of a new and improved fluid pressure motor of the diaphragm type wherein the diaphragm forms its own seal relative to the diaphgram back-up plate.

A still further object of the present invention is the provision of a new and improved fluid pressure servomotor construction wherein its movable wall is formed by means of a diaphragm and a one piece rigid member so arranged that it can be molded in one piece, said diaphragm forming a seal with respect to the rigid member without the aid of additional parts or clamping structure.

Figure 1:
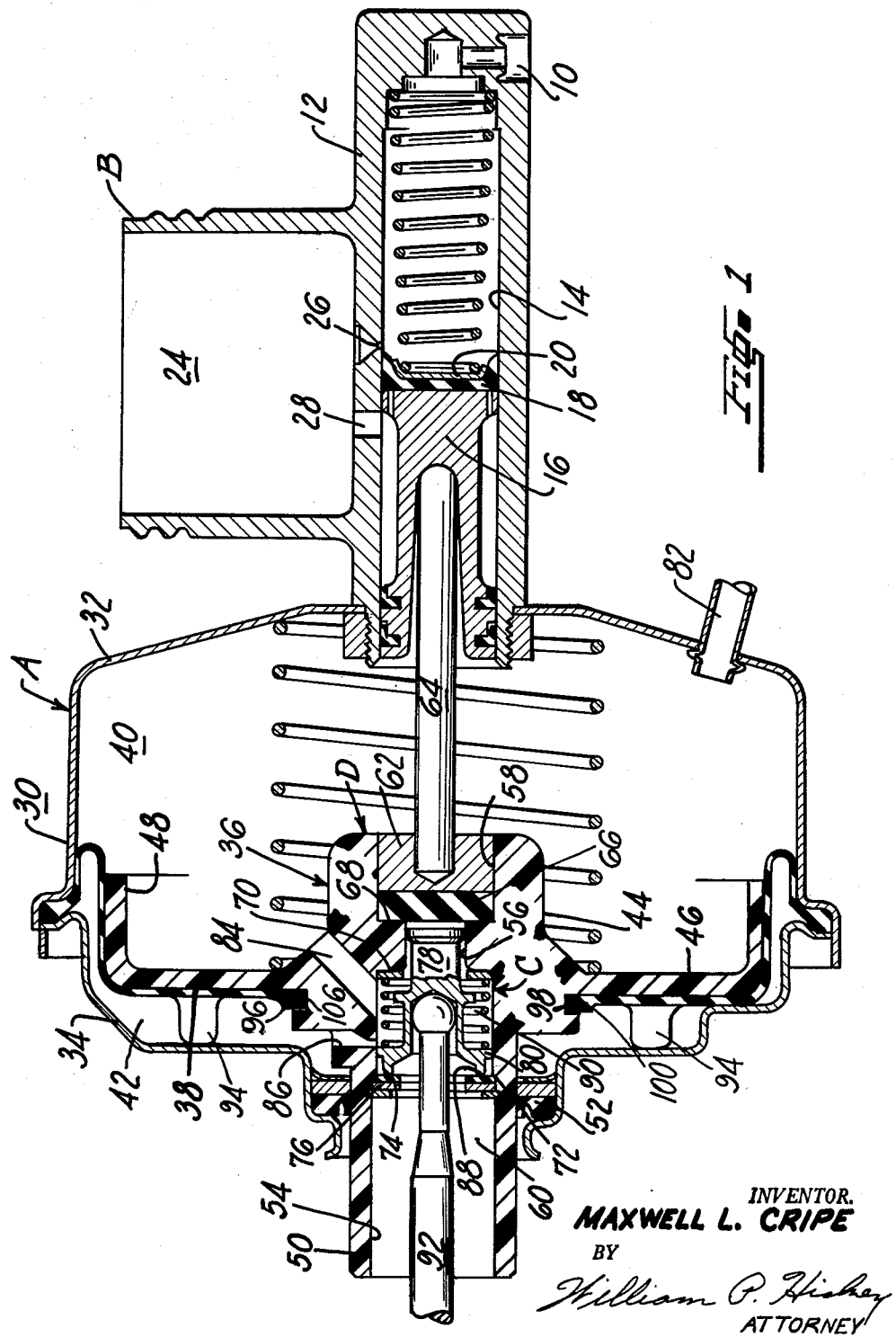
Figure 2:
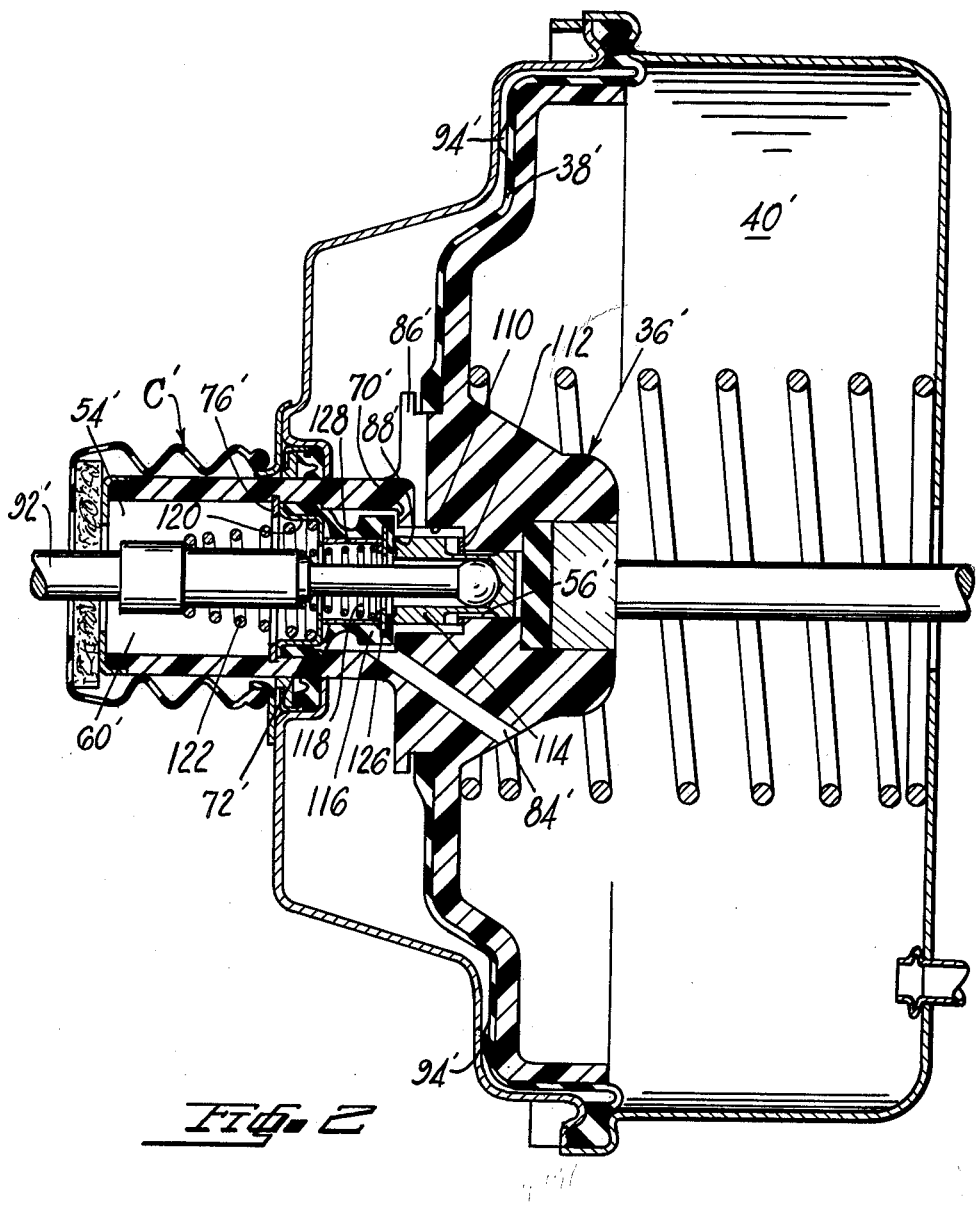

The invention resides in certain constructions and combinations and arrangements of parts; and further objects and advantages of the invention will become apparent to those skilled in the art to which it relates from the following description of the preferred embodiment described with reference to the accompanying drawings forming a part of this specification, and in which:

FIGURE 1 is a cross sectional view of a power operated master clyinder used to operate the brakes of an automotive vehicle, and in which principles of the present invention are embodied; and FIGURE 2 is a cross sectional view of a fluid pressure servomotor which can be used in place of the one shown in FIGURE 1, and which also embodies principles of the present invention.

The power operated master cylinder shown in FIGURE 1 of the drawings is of the type used to actuate the hydraulic brakes of an automotive vehicle. The unit generally comprises a fluid pressure servomotor A which is attached to one end of a master cylinder B whose outlet 10 is connected to the hydraulic lines of the brake system which it actuates. The master cylinder B, shown, is of a cast construction with its cast body 12 having the usual fluid pressurizing chamber 14 opening outwardly of the rear end of the cast body 12. A conventional spool shaped piston 16 is shown in its retracted position adjacent the rear end of the fluid pressurizing chamber 14, and is provided with the usual sealing structures adjacent its opposite ends. The sealing structure on its forward end includes the usual cup seal 18 which is held against the inner surface of the piston 16 by the seal retainer 20 and piston return spring 22. The master cylinder B further includes a reservoir 24 which overlies the pressurizing chamber 14 for the purpose of providing make-up fluid for the hydraulic system, should leakage or expansion occur. A small compensating port 26 communicates the reservoir 24 with the chamber 14 just forwardly of the retracted position of the cup seal 18; so that the lip of the seal 18 slides over the compensating port and closes it off when the piston 16 is driven forwardly in the fluid pressurizing chamber. Another large diameter passage 28 communicates the reservoir 24 with the portion of the piston 16 between its seals on its opposite ends, to insure that atmospheric pressure exists in this region at all times.

Piston 16 is adapted to be moved down its bore 14 by means of the fluid pressure servomotor A. According to principles of the present invention, a servomotor construction has been provided which greatly reduces the number of parts that have heretofore been thought necessary; so that the design is epitome of simplicity, and has greatly reduced a manufacturing cost of a fluid pressure servomotor. The housing 30 of the servomotor is formed by means of a front and rear shell stamping 32 and 34 respectively, which are assembled according to the principles set forth in the Price et al. application Serial No. 39,932, filed June 30, 1960, now Patent No. 3,083,698. According to further principles of the present invention, the power driven element of the servomotor A is formed by a single cast or molded part which is so arranged or constructed as to provide the necessary valve chambers, passages and reaction producing structure. The movable element of the servomotor is completed by means of a diaphragm 38—the outer periphery of which is clamped to the shell in any convenient manner, and the internal portion of which is automatically retained on and provides its own seal with respect to the structure 36 when it is snapped into position thereon.

While certain of the principles of the present invention can be incorporated into what are commonly known as atmospheric suspended units, still further economies and advantages are obtained by the design shown in the drawing wherein vacuum is communicated to both of the opposing chambers 40 and 42 during the normal de-energized condition of the servomotor. The casting 36 has an axially extending main body portion 44 which includes a radially extending flange portion 46 thereon which acts as a support for the diaphragm 38. The radially extending flange portion 46 may in some instances terminate in a rounded end so that the diaphragm 38 does not bear against any appreciable peripheral portion of the structure 46; but in the preferred embodiment shown in the drawing, the periphery of the flange 46 is turned axially rearwardly at approximately a right angle as at 48, so that the diaphragm 38 breaks over a generally rounded right angle and lays against an appreciable generally cylindrical surface. Inasmuch as the unit shown in the drawing is a vacuum suspended one, the main body portion 44 includes an axially rearwardly extending hub or boss 50 whose outer surfaces is generally cylindrical and extends through a suitable opening in a rear shell section 34. A suitable vacuum seal 52 is provided between the periphery of the hub 50 and the shell 34 to prevent the entrance of air there past at all times.

According to still further principles of the present invention the movable elements of the units control valve C and its reaction producing structure D are so designed so as to fit into an axially extending chamber formed through the casting 36 by the axial separation of opposing die or mold sections. The opening 54 has a small diameter center section 56 and larger diameter sections 58 and 60 adjacent its front and rear ends, respectively. The front chamber 58 of the opening 54 forms what is known as the reaction chamber portion, and the chamber 58 slidably receives the headed end 62 of the force transmitting rod 64. The opposite end of the rod 64 bears against the piston 16 in the usual manner, and a block of an elastomeric material 66 is positioned between the head 62 and the shoulder 68 on the inner end of the reaction chamber portion 58. The rear large diameter section 60 of the axially extending opening 54 houses the control valve structure C of the unit; and the section 60 is provided with an inner shoulder 70 adjacent the small diameter portion 56, and a small shoulder 72 formed by counterboring its outer end. An atmospheric valve seat is formed by a rubber coated washer 74 seated against the small shoulder 72 and held in place by a snap ring 76. The control poppet for the unit is formed by automatic screw machine part 78—the inner end of which is slidably received in the small diameter opening section 56, and the rear surface of which is slidingly received by the sidewalls of the rear section 60 of the opening 54. Vacuum is continually communicated to the front opposing power chamber 40 by means of the vacuum connection 82; and the vacuum is thereafter normally communicated to the rear opposing power chamber 42, passage 84, valve chamber 60 and the control passage 86. The poppet member 78 includes an atmospheric valve seat 88 on its rearwardly facing end; and the poppet member 78 is normally biased into engagement with the atmospheric valve seat 74 by means of the coil spring 90 so as to prevent air from entering through the rear end of the chamber 60.

The control valve C shown in FIGURE 1 is what is known as a slide valve; and upon inward movement of the control rod 92, flange 80 of the poppet 78 is moved forwardly over the control port 86 to close off vacuum communication between the opposing chambers 40 and 42; and thereafter further forward movement admits air flow past the rear flange 80 of poppet member to the control port 86. Air flow into the rear opposing power chamber 42 produces a differential pressure across the diaphragm 38 which moves the casting 36 forwardly to compress the elastomeric material 66 between the shoulder 68 and head 62 of the force transmitting member 64. The elastomeric material is thereby pressurized and caused to flow up against the inner end of the control member 78. An internal pressure is built up within the block of elastomeric material 66, the control member 78 is forced rearwardly to a position where its flange 80 again covers the control port 86. No further change in the pressure in the rear opposing chamber 42 thereafter occurs, and the power driven element 36 remains stationary.

When it is desired to release the braking effort, the force applied to the control rod 92 is reduced; whereupon the pressure of the elastomeric material 66 against the control member 78 causes it to move rearwardly. Rearward movement of the control rod 92 causes the flange 80 to open the control port 86 and allow air to bleed from the rear opposing power chamber 42 to the front opposing power chamber 40. If it should be desired to prevent further reduction in braking effort, rearward movement of the control rod 92 is prevented; whereupon the power driven element 36 moves rearwardly relative to the control member 78 by an amount which causes the flange 80 to close off the control port 86 and prevent further change in pressure in the power chamber 42. A complete release of the force applied to the control rod 92, permits the coil spring 90 to bias the seat 88 against the seat 74 to prevent further air flow to the rear opposing power chamber 42, and in turn permit full vacuum communication therewith. The movable element 36 then moves to the position shown in the drawing, wherein rubber bumpers 94 on the diaphragm 38 abut the rear shell stamping 34.

According to further principles of the present invention the diaphragm 38 and the power driven element 36 are so formed that the diaphragm 38 can be easily snapped into position on the power driven element 36 and automatically effect a seal therewith, without the aid of additional clamping or sealing structure. According to these principles, a smooth peripheral surface 96 is provided in the periphery of the element 36, and a suitable opening is provided in the diaphragm 38; so that its sidewalls 98 will provide a tight interference fit with respect to the surface 96. Inasmuch as it is intended that the diaphragm will be slipped over the rearwardly extending hub 50, the surface 96 should preferably have a larger cross section than the hub 50; and the surface 96 is most preferably positioned in a step or shelf provided on or adjacent the rear surface of the flange 46. The smooth peripheral surface 96 preferably forms a right angle with the rear radially extending surface of the flange 46, and the rear surface of the flange 46 is preferably smooth; so that sufficient friction is developed between the diaphragm 38 and flange 46 to prevent force on the diaphragm from stretching the diaphragm and pulling its surface 98 free of the surface 96, and thereby break the seal therewith. While an absolutely smooth surface is not required to prevent stretching of the diaphragm 38, additional sealing is provided between the rear surface of the flange 46 and diaphragm so as to be desirable in most instances.

In the preferred construction shown in the drawing, the diaphragm 38 is folded over a rounded corner and laid up against the axially extending flange 48 so that additional friction is obtained between the flange 48 and diaphragm. By folding the diaphragm over the rounded edge, tension on the diaphragm produces a greatly increased frictional force over the rounded right angle surface which greatly reduces the radial tension in the portion of the diaphragm 38 adjacent its opening 98. The diaphragm 38 is preferably molded of an unreinforced elastomeric material, and is preferably axially thickened as at 100 around its central opening to increase the sealing area with respect to the surface 96 and provide additional strength. A rear abutment surface 104 is provided, as by the recess 106, to prevent rearward force on the diaphragm from slipping the diaphragm out of sealing engagement with the flange 46; and it should be noted that this abutment surface 104 need not necessarily be continuous around the periphery of the power driven element 36.

The embodiment shown in FIGURE 2 of the drawings corresponds generally to that shown in FIGURE 1; and differs principally in that the valve structure C shown therein is of the poppet type. Those portions of FIGURE 2 which are similar to corresponding portions in FIGURE 1 are designated by a like reference numeral characterized further in that a prime mark is affixed thereto. In the embodiment shown in FIGURE 2 the passageway 84' communicates rearwardly of the flange 70', and a slight counterbored section 110 is provided in the center section 56' of the opening 54' to provide a shoulder 112 against which the control member 114 of the valve structure C' may bottom out. In the embodiment shown in FIGURE 2, the shoulder 70' provides the vacuum seat of the valve, and a generally flexible diaphragm type poppet 116 is biased thereagainst by a coil spring 118. In the embodiment shown in FIGURE 2 a shoulder 72' is spaced slightly further inwardly of the snap ring 76' than in the embodiment shown in FIGURE 1; and the periphery of the diaphragm poppet 116 is squeezed between the shoulder 72' and snap ring 76' by means of the retainer 120 and the valve return spring 122. The control member 114 is positioned generally inwardly of the shoulder 70', and its rearwardly projecting atmospheric valve seat 88' is biased against the flexible poppet 116 by reason of the valve return spring 122. The flexible poppet 116 is suitably stiffened in the region adjacent the vacuum and atmospheric valve seat 70' and 88'; and the light coil spring 118 is positioned between the control rod 92' and the poppet stiffening ring 126 to assure a sealing force with respect to the respective seats. The control port 86' extends between the slight counterbore 110 and the rear power chamber 42', so that flow past either of the two valve seats 70' or 88' will be communicated to the rear opposing power chamber 42'.

In the normal released condition of the servomotor, the parts will be as shown in FIGURE 2 of the drawings. When it is desired to actuate the servomotor, the control member 114 is moved forwardly to permit the poppet 116 to engage the vacuum valve seat 70'. Thereafter vacuum communication between the opposing power chambers 40' and 42' is prevented, and a slight further inward movement of the control member 114 causes separation of the control member 114 from the poppet member 116 to permit air pressure to flow to the rear opposing power chamber 42'. A build-up in differential across the movable element 36' causes it to move forwardly, and the brakes to be applied in the same manner as in the embodiment shown in FIGURE 1. When it is desired to reduce the braking effort, the force on the control rod 92' is reduced to permit it to move rearwardly in the same manner as described for the embodiment shown in FIGURE 1. Rearward movement of the control member 114 causes it to abut the poppet member 116 and move it out of engagement with the vacuum valve seat 70'; whereupon the pressure in the rear power chamber 42' is reduced. A complete removal of actuating force on the control rod 92' permits the coil spring 118 to move the control member 114 rearwardly until the tubular stop 128 that is carried on the inside of the poppet member 116 abuts the retainer 120. A complete reduction in pressure in the rear opposing power chamber 42' is thereby produced, and the movable element 36' moves to its retracted position shown wherein the rubber bumpers 94' engage the rear shell section 34'.

It will be apparent that the objects heretofore enumerated as well as others have been accomplished; and that there has been provided a fluid pressure servomotor construction having a power driven structure formed by a one piece stiffening structure on to which a molded diaphragm is snapped to automatically effect a seal therewith. The diaphragm itself can be molded of a single elastomeric material such as a synthetic rubber; and stiffening structure is so formed as to house valve and reaction producing structures which are assembled by merely sliding their parts into openings formed in the stiffening structure.

While the invention has been described in considerable detail, I do not wish to be limited to the particular constructions shown and described; and it is my intention to cover hereby all novel adaptations, modifications and arrangements thereof which come within the practice of those skiled in the art to which the invention relates.

I claim:
1. In a fluid pressure motor: a housing having front and rear ends through which an imaginary axis extends; a movable element having a recess in its outer surface, said recess being of unit construction and having a smooth bottom surface of a predetermined dimension, and the front end wall of said recess extending generally radially outwardly to a point leaving a small annular space between said wall and said housing to provide a diaphragm abutment surface; a diaphragm of a stretchable material the major portion of which abuts said diaphragm abutment surface, said diaphragm having a central opening therethrough which opening is of lesser dimension than said bottom surface of said recess such that an interference fit is formed between the opening of said diaphragm and said bottom of said recess, which interference fit sealingly connects said diaphragm to said movable wall, said diaphragm laying up against said abutment surface to provide frictional contact therewith; and the outer periphery of said diaphragm being sealed to said housing.

2. In a fluid pressure motor: a housing having front and rear ends through which an imaginary axis extends; an axially extending movable element of unit construction with a central valve chamber and a central reaction chamber separated by an inward projection of said movable element, said movable element further having a flange with a generally radially extending rearwardly facing diaphragm abutment surface from which an axially rearwardly extending boss projects, said movable element having a stepped portion between said boss and abutment surface, said stepped portion having a radially inwardly extending recess therein adjacent said abutment surface of said flange, with said recess having a smooth bottom surface; a diaphragm having a central opening therethrough which provides an interference fit with said bottom of said recess and an outer periphery sealed to said housing, said diaphragm being sufficiently stretchable to be stretched over said stepped portion and snapped into said recess to form a seal with the bottom of said recess, and said diaphragm laying up against said abutment surface to provide sufficient frictional contact therewith to prevent said diaphragm from being pulled out of said recess and its seal broken.

3. In a fluid pressure motor: a housing having front and rear ends through which an imaginary axis extends, an axially extending movable element of unit construction with a valve chamber and a concentric reaction chamber on said imaginary axis separated by a annular ring of said movable element, said movable element further having a flange with a generally radially extending rearwardly facing diaphragm abutment surface which rounds over to a generally axially forwardly extending peripheral surface, said movable element having a boss extending axially rearwardly from said abutment surface, said boss having a radially inwardly extending recess therein adjacent said abutment surface of said flange; a diaphragm having a central opening therethrough which fits into said recess and an outer periphery sealed to said housing, said diaphragm being sufficiently stretchable to be stretched over said boss and snapped into said recess to form a seal with said diaphragm abutment surface, and said diaphragm laying up against said radially extending portion and having a folded over curtain portion which rolls against said axially extending portion of said flange to at all times provide sufficient frictional contact therewith to prevent said diaphragm from being pulled out of said recess and its seal broken.

4. In a fluid pressure motor: a housing having front and rear ends through which an imaginary axis extends; an axially extending one-piece movable element having a flange with a smooth generally radially extending rearwardly facing diaphragm abutment surface which rounds over to a generally axially forwardly extending surface, said movable element having a boss extending axially rearwardly from said abutment surface, said movable element having a stepped portion between said boss and said abutment surface, said stepped portion having a radially inwardly extending recess therein adjacent said abutment surface of said flange with said recess having a smooth bottom surface of a predetermined peripheral dimension; a diaphragm having a central opening therethrough which central opening is of lesser dimension than said peripheral dimension of said bottom surface of said recess to sealingly connect said diaphragm and said movable element by an interference fit between a surface of said diaphragm surrounding said opening and said bottom of said recess, said diaphragm having an outer periphery sealed to said housing, said diaphragm surfaces surrounding said opening being constructed as an axially thickened portion to substantially fill said recess when said diaphragm is snapped into said recess to form a seal connection with the bottom of said recess, and said diaphragm laying up against said radially extending abutment surface and having a folded over curtain portion which rolls along said axially extending portion to at all times provide sufficient frictional contact therewith to prevent said diaphragm from being pulled out of said recess and its seal broken.

5. A simplified servomotor construction comprising a housing having an internal chamber with front and rear opposite end walls through which an imaginary axis extends; an axially extending movable element having a generally radially extending flange portion inside said housing, and a generally tubular portion projecting through the rear end wall of said housing, said flange portion having a shelf with a radially inwardly extending recess, said recess having a smooth bottom surface and a front side surface which is generally in the plane of the rearwardly facing surface of said flange; a diaphragm of a stretchable material having an opening therethrough whose walls have an interference fit with the bottom of said recess, said diaphragm having an axially thickened portion surrounding said opening and being stretchable over said shelf for positioning in said recess, said diaphram being positioned against said rearwardly facing surface with its periphery sealed to said housing, said movable element having an axially extending opening therethrough passing through said tubular projection, said opening having a reduced diameter center portion separating front and rear open ended generally cylindrical chambers; a driven member slidably positioned in said front chamber with a block of elastomeric material positioned between said driven members and said movable element; a valve control member positioned in said rear chamber with a portion projecting into said center portion of said opening for engagement with said elastomeric material, said control member having a rearwardly facing annular valve seat; and an annular valve sealing member pressed into said rear chamber for engagement by said control member, said movable element having a passage communicating its front surface with the inner end of said rear chamber and another passage communicating the external surface of said movable element to the rear of said flange with said opening forwardly of said annular valve sealing member.

6. In a fluid pressure servomotor and the like: a housing having an internal axially extending chamber therein; a movable wall in said chamber, said movable wall having a generally cylindrically shaped boss axially extending through one end of said housing, said boss having an axially extending internal valve chamber therein which is stepped down in at least two successive stages to provide inner and outer shoulders facing axially outwardly of said valve chamber, an annular flexible poppet member having an inner thickened portion for engaging said inner shoulder, an outer portion having an interference fit with the sidewalls of said valve chamber, and an integral flexible portion interconnecting said inner and outer portions, a control member positioned axially inwardly of said poppet member and having an axially outwardly facing valve seat for engaging said poppet member radially inwardly of said inner shoulder and adapted for axial movement to sealingly engage said poppet member and disengage it from said inner shoulder, a control rod connected to said control member and projecting axially outwardly through said annular poppet member, means biasing said outer portion of said poppet member radially outwardly into sealing engagement with the sidewalls of said valve chamber and axially inwardly against said outer shoulder, and said movable wall having a low pressure source communicating with said valve chamber between said shoulders, a control passage communicating to the portion of said valve chamber inwardly of said inner shoulder, and a higher pressure source communicating to the outer end of said valve chamber.

7. In a fluid pressure servomotor and the like: a housing having an internal axially extending chamber therein; a movable wall in said chamber, said movable wall having a generally cylindrically shaped boss axially extending through one end of said housing, said movable wall having an axially extending opening therethrough including said boss which is stepped down in at least two successive stages to provide inner and outer shoulders facing axially outwardly of said servomotor, an annular flexible poppet member having an inner thickened portion for engaging said inner shoulder, an outer portion having an interference fit with the sidewalls of said valve chamber, and an integral flexible portion interconnecting said inner and outer portions, a control member positioned axially inwardly of said poppet member and having an axially outwardly facing valve seat for engaging said poppet member radially inwardly of said inner shoulder and adapted for axial movement to sealingly engage said poppet member and disengage it from said inner shoulder, a control rod connected to said control member and projecting axially outwardly through said annular poppet member, means biasing said outer portion of said poppet member radially outwardly into sealing engagement with the sidewalls of said valve chamber and axially inwardly against said outer shoulder, said movable wall having a low pressure source communicating with said valve chamber between said shoulders, a control passage communicating to the portion of said valve chamber inwardly of said inner shoulder, and a higher pressure source communicating to the outer end of said valve chamber, said movable wall also having an axially inwardly facing shoulder in said opening inwardly of said control passage, a block of elastomeric material seated against said shoulder, and a force transmitting member slidably engaging the sidewalls of said opening and positioned adjacent the inner face of said block of elastomeric material.

References Cited in the file of this patent
UNITED STATES PATENTS

| | | |
|---|---|---|
| 2,799,252 | Ingres | July 16, 1957 |
| 2,811,925 | Crookston | Nov. 5, 1957 |
| 2,969,776 | Riester | Jan. 31, 1961 |
| 2,985,143 | Stelzer | May 23, 1961 |